United States Patent
Goi et al.

(10) Patent No.: US 9,765,861 B2
(45) Date of Patent: Sep. 19, 2017

(54) SEALING ARRANGEMENT OF ACCESSORY TO AIRCRAFT ENGINE

(75) Inventors: Tatsuhiko Goi, Kobe (JP); Kenichiro Tanaka, Kobe (JP); Koji Watanabe, Kobe (JP); Isao Fujii, Kakogawa (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 444 days.

(21) Appl. No.: 14/110,016

(22) PCT Filed: Apr. 4, 2012

(86) PCT No.: PCT/JP2012/059247
§ 371 (c)(1),
(2), (4) Date: Oct. 4, 2013

(87) PCT Pub. No.: WO2012/137844
PCT Pub. Date: Oct. 11, 2012

(65) Prior Publication Data
US 2014/0026589 A1    Jan. 30, 2014

(30) Foreign Application Priority Data
Apr. 7, 2011    (JP) .................................. 2011-085428

(51) Int. Cl.
*F16H 15/00*    (2006.01)
*F02C 7/32*    (2006.01)
(Continued)

(52) U.S. Cl.
CPC ............. *F16H 15/00* (2013.01); *F02C 7/275* (2013.01); *F02C 7/32* (2013.01); *F02C 7/36* (2013.01);
(Continued)

(58) Field of Classification Search
CPC .... F02C 7/275; F02C 7/28; F02C 7/32; F02C 7/36; F16H 1/12; F16H 15/00;
(Continued)

(56) References Cited

U.S. PATENT DOCUMENTS 2,978,869 A    4/1961    Hiscock et al.
3,688,560 A    9/1972    Broman et al.
(Continued)

FOREIGN PATENT DOCUMENTS

CN    1902389 A    1/2007
CN    101235753 A    8/2008
(Continued)

OTHER PUBLICATIONS

Communication dated Jul. 1, 2014, issued by the Japanese Patent Office in counterpart Japanese application No. 2013-508912.
(Continued)

*Primary Examiner* — Arun Goyal
(74) *Attorney, Agent, or Firm* — Sughrue Mion, PLLC (57) ABSTRACT

To provide an aircraft engine in which an accessory can be directly supported with no accessory gearbox intervening to thereby suppress an increase in size thereof, the aircraft engine (E) includes a take-out shaft (11) having a first end portion, connected with an engine rotary shaft (9) and extending in a radially outward direction, and also having a second end portion connected with an accessory (1), and a mounting pad (12) provided in an engine main body (EB) and to which the accessory (1) is fitted. The mounting pad (12) forms an outer perimeter of an opening (48) through which the take-out shaft (11) extends. The opening (48) is sealed by a covering (47), through which the take-out shaft (1) extends, and a sealing member (49) to seal between the covering (47) and the take-out shaft (11).

8 Claims, 6 Drawing Sheets

(51) Int. Cl.
*F02C 7/36* (2006.01)
*F02C 7/275* (2006.01)

(52) U.S. Cl.
CPC .............. *F05D 2260/4031* (2013.01); *F05D 2260/532* (2013.01); *F05D 2270/024* (2013.01); *F05D 2270/304* (2013.01); *Y02T 50/671* (2013.01)

(58) Field of Classification Search
CPC .. F16H 57/023; F16H 57/029; F05D 2240/55; F05D 2260/4031
See application file for complete search history.

(56) References Cited

U.S. PATENT DOCUMENTS

| | | | |
|---|---|---|---|
| 3,799,476 | A | 3/1974 | Bouiller et al. |
| 3,834,161 | A | 9/1974 | Quigley, Jr. et al. |
| 4,252,035 | A | 2/1981 | Cordner et al. |
| 4,712,370 | A * | 12/1987 | MacGee ............... F01D 21/003 277/345 |
| 5,470,114 | A | 11/1995 | Umney et al. |
| 6,244,600 | B1 | 6/2001 | Leturcq |
| 6,561,940 | B2 | 5/2003 | Goi et al. |
| 7,386,983 | B2 | 6/2008 | Miller |
| 7,707,909 | B2 | 5/2010 | Linet et al. |
| 7,728,447 | B2 | 6/2010 | Becquerelle et al. |
| 7,757,655 | B2 | 7/2010 | Inui et al. |
| 8,113,005 | B2 | 2/2012 | Gotz et al. |
| 8,449,431 | B2 | 5/2013 | Goi et al. |
| 8,905,191 | B2 | 12/2014 | Brandt et al. |
| 2001/0003108 | A1 | 6/2001 | Goi et al. |
| 2005/0183529 | A1 | 8/2005 | Miller |
| 2006/0248900 | A1 | 11/2006 | Suciu et al. |
| 2007/0130959 | A1 | 6/2007 | Linet et al. |
| 2007/0173365 | A1 | 7/2007 | Linet et al. |
| 2008/0238098 | A1 | 10/2008 | Becquerelle et al. |
| 2008/0257298 | A1 | 10/2008 | Inui et al. |
| 2009/0165464 | A1 | 7/2009 | Gotz et al. |
| 2009/0188334 | A1 * | 7/2009 | Merry ...................... F02C 7/32 74/15.2 |
| 2009/0324396 | A1 | 12/2009 | Short et al. |
| 2010/0200692 | A1 | 8/2010 | Goi et al. |
| 2010/0300117 | A1 | 12/2010 | Moulebhar |
| 2011/0284328 | A1 | 11/2011 | Brandt et al. |

FOREIGN PATENT DOCUMENTS

| | | |
|---|---|---|
| CN | 101410591 A | 4/2009 |
| EP | 1106870 A2 | 6/2001 |
| EP | 1 980 732 A2 | 10/2008 |
| JP | 55-27582 A | 2/1980 |
| JP | 2001-158400 A | 6/2001 |
| JP | 2001-317374 A | 11/2001 |
| JP | 3440287 B2 | 8/2003 |
| JP | 2008-82208 A | 4/2008 |
| JP | 2008-190526 A | 8/2008 |
| JP | 2009-532613 A | 9/2009 |
| JP | 2010-179815 A | 8/2010 |
| WO | 2005045215 A1 | 5/2005 |
| WO | 2007/112726 A1 | 10/2007 |
| WO | 2010/086422 A1 | 8/2010 |

OTHER PUBLICATIONS

Communication dated Jul. 8, 2014, issued by the Japanese Patent Office in counterpart Japanese application No. 2013-508911.
Communication dated Feb. 10, 2015 from the Japanese Patent Office in counterpart Application No. 2013-508911.
Communication dated Apr. 1, 2015 from the State Intellectual Property Office of the P.R.C. in counterpart application No. 201280015823.0.
Communication dated Mar. 31, 2015 from the State Intellectual Property Office of the P.R.C. in counterpart application No. 201280016072.4.
Communication dated Mar. 23, 2015 from the European Patent Office in counterpart application No. 12767294.7.
Communication dated Mar. 25, 2015 from the European Patent Office in counterpart application No. 12767296.2.
Communication dated Dec. 9, 2015, from the State Intellectual Property Office of the People's Republic of China in counterpart application No. 201280016072.4.
International Preliminary Report on Patentability mailed Nov. 14, 2013, issued in International Application No. PCT/JP2012/059247.
Communication dated Apr. 11, 2016 from the United States Patent and Trademark Office issued in corresponding U.S. Appl. No. 14/110,050.
An Office Action dated Aug. 19, 2016, which issued during the prosecution of U.S. Appl. No. 14/110,050.

* cited by examiner

SEALING ARRANGEMENT OF ACCESSORY TO AIRCRAFT ENGINE

CROSS REFERENCE TO THE RELATED APPLICATION

This application is a National Stage of International Application No. PCT/JP2012/059247 filed Apr. 4, 2012, claiming priority based on Japanese Patent Application No. 2011-085428 filed Apr. 7, 2011, the contents of all of which are incorporated herein by reference in their entirety.

BACKGROUND OF THE INVENTION

Field of the Invention

The present invention relates to an engine for aircrafts, which is of a type equipped with an accessory that is driven by an engine rotary shaft.

Description of Related Art

An accessory or auxiliary equipment such as, for example, an electric power generator or any of various pumps, which is used in association with an aircraft is supported by an engine main body through an accessory gearbox (AGB) and is driven by an engine rotary shaft through gears in the accessory gearbox coupled with the engine rotary shaft. In this respect, see the patent documents 1 and 2 listed below.

PRIOR ART LITERATURE

[Patent Document 1] U.S. Pat. No. 7,386,983
[Patent Document 2] U.S. Pat. No. 7,707,909

DISCLOSURE OF THE INVENTION

It has, however, been found that the accessory to be fitted to the aircraft engine in recent years is increasing in size, which in turn leads to an increase in size of the accessory gearbox for use in supporting the accessory. In particular, the electric power generator, which is one of aircraft accessories, in the past had an output rating of about 90 kVA, but in recent years, consequent upon the increasing use of electric parts and equipments in aircrafts, the electric power generator used in those aircrafts come to be required to have a large electric capacity exceeding 200 kVA along with the increase in size thereof. In addition to the increase in size of the accessory, where the number of accessories to be fitted increases, the accessory gearbox used to support those accessories is, too, increased in size, and this will in turn results in the increase of the overall weight of the aircraft engine as well as the increase of the cost and the air resistance.

In view of the above, the present invention has for an object to provide an aircraft engine of a type in which an accessory can be directly supported by an engine main body with no accessory gearbox intervening between it and the engine main body to thereby suppress the increase in size thereof which would be brought about by the increases in size of the accessory and in the number of mountings.

In order to accomplish the foregoing object of the present invention, there is provided an aircraft engine which includes an engine main body, an engine rotary shaft, an accessory adapted to be driven by the engine rotary shaft, a take-out shaft having a first end portion connected with the engine rotary shaft so as to extend radially outwardly of the engine and also having a second end portion opposite to the first end portion thereof and connected with the accessory, a mounting pad provided in the engine main body and to which mounting pad the accessory is fitted, the mounting pad defining an outer perimeter of an opening through which the take-out shaft extends, a covering, through which the take-out shaft extends, and a sealing member for sealing between the covering and the take-out shaft. The opening in the mounting pad is sealed by the covering and the sealing member.

Since in the aircraft engine of the present invention, the accessory is connected with the mounting pad of the engine main body and is thus supported by the engine main body, there is no need to dispose any existing accessory gearbox intermediate between the accessory and the engine main body. Because of it, even though the shape of the accessory becomes large and/or the number of fittings of the accessories increases, the accessory gearbox need not be employed and, therefore, the increase in overall shape of the aircraft engine can be suppressed. The accessory is connected with the take-out shaft extending through the covering within the opening of the mounting pad and is driven by the engine rotary shaft through this take-out shaft. Accordingly, in the aircraft engine of a type referred to in connection with the present invention, if the mounting pad fitted to the engine main body is of a large diameter shape, an accessory casing of the accessory can be firmly supported by the mounting pad of the large diameter even when the accessory is increased in size. Also, even if the mounting pad is of the large diameter, there is no ingress of the foreign matters into the engine main body through the opening, because the opening inside the mounting pad is sealed by the covering and the sealing member.

In the practice of the present invention, the mounting pad referred to above is preferably butted with an accessory flange, which is formed in the accessory, so that the both can be connected together with the use of a connecting element. By so doing, the accessory flange is connected with the mounting pad of the engine main body in a butted fashion and, therefore, the accessory can be firmly fitted to the engine main body.

If the connecting element referred to above is employed in the form of a connecting band, the accessory can be supported by the engine main body merely through a simple process of applying the connecting band over the mounting pad and the accessory flange, which are butted together, from outside.

For the connecting element referred to above, a bolt and an associated nut can be employed. The use of the bolt and the associated nut makes it possible to firmly connect the mounting pad and the accessory flange, which are butted together, merely by means of the nut fastened to the bolt.

In a preferred embodiment of the present invention, the take-out shaft referred to above is preferably connected with a low pressure shaft forming a part of the engine rotary shaft. In this case, unlike the high pressure shaft having a limited take-out load for the purpose of avoiding an engine stall, the accessory can be driven by the low pressure shaft enough to provide a large capacity power because of the low pressure shaft having less limitation on take-out load.

The accessory referred to above is preferably employed in the form of an electric power generating device. In this case, even if a large electric power generating capacity is required and even though the electric power generating device is correspondingly increased in size, the increase in size of the engine as a whole can be suppressed.

In another preferred embodiment of the present invention, the take-out shaft referred to above is preferably splined to an input shaft of the accessory. The splined connection is particularly advantageous in that the take-out shaft can be connected with the input shaft of the accessory for rotation together therewith, but movement in an axial direction relative to each other, and, therefore, the accessory can be easily selectively connected with or separated from the engine rotary shaft.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described in detail with particular reference to the accompanying drawings. In particular, FIG. 1 pertains to the first preferred embodiment of the present invention and illustrates a schematic structural diagram showing the manner of connection of an electric power generating device 1, which is one of accessories for an aircraft engine E. The aircraft engine E shown therein is a two shaft type or a double shaft type fan engine of a kind including a high pressure shaft 7 and a low pressure shaft 9 that are used as rotary drive shafts of the engine E. A engine main body EB thereof includes a compressor 2, a combustor 3, a turbine 4 and a fan 10 as principal component parts and also includes a main body casing BC for enclosing the compressor 2, the combustor 3 and the turbine 4, and a fan casing FC for enclosing the fan 10. A compressed air supplied from the compressor 2 is, after having been mixed with fuel, burned within the combustor 3 to produce a high temperature, high pressure combustion gas which is in turn supplied to the turbine 4.

Figure 1:
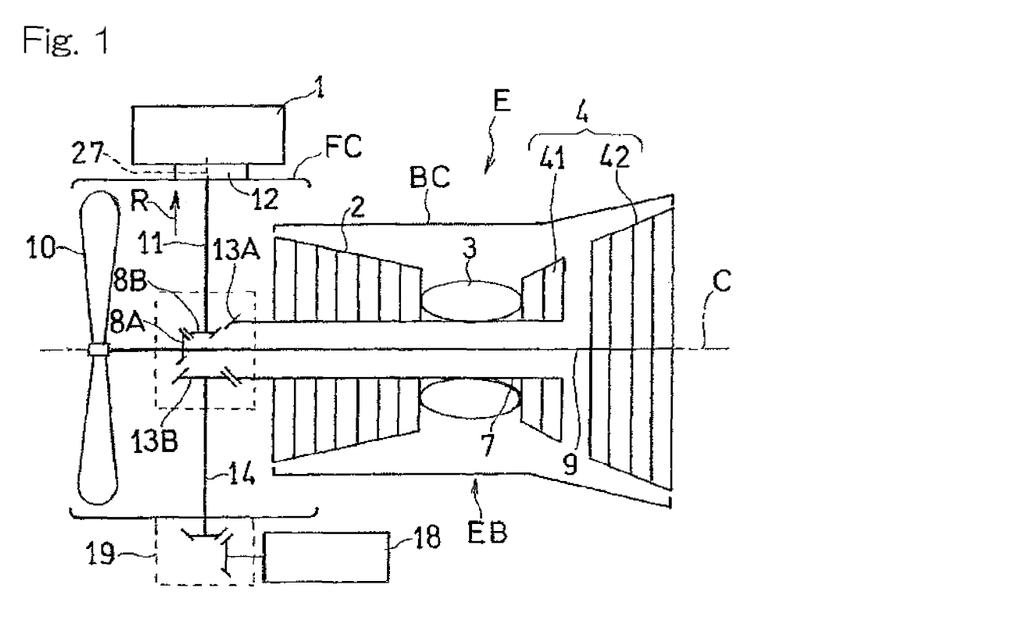
FIG. 1 is a schematic side view of an aircraft engine according to a first preferred embodiment of the present invention, showing how an accessory is connected.

The turbine 4 referred to above includes a high pressure turbine 41 on a front stage and a low pressure turbine 42 on a rear stage, and the compressor 2 referred to above is drivingly connected with the high pressure turbine 41 through a hollow, high pressure shaft 7 to be driven thereby. The fan 10 referred to above is drivingly connected with the low pressure turbine 42 through a low pressure shaft 9, which is inserted into the hollow of the high pressure shaft 7, and is driven by the low pressure turbine 42. The high pressure shaft 7 and the low pressure shaft 9 are so arranged as to be coaxial with a common engine shaft axis C or the longitudinal axis of the aircraft engine E. Accordingly, an engine thrust force can be delivered by a jet stream of combustion gases, jetted from the low pressure turbine 42, and a high speed air stream created by the fan 10.

A first bevel gear 8A is provided at a portion of the low pressure shaft 9 rearwardly of the fan 10, and a second bevel gear 8B meshed with the first bevel gear 8A is fixedly mounted on a first end of a first connecting shaft (take-out shaft) 11 which extends in a direction radially of the low pressure shaft 9. As will be detailed later, an input shaft of an electric power generating device 1 (transmission mechanism input shaft) is connected with a second end of the first connecting shaft 11, which is opposite to the first end thereof, so that the electric power generating device 1 can be driven by the low pressure shaft 9 by way of the bevel gear system referred to above. In other words, unlike the conventional standard aircraft electric power generating device in which the high pressure shaft 7 is used as a rotary drive shaft of the aircraft engine E, the low pressure shaft 9 is used as a rotary drive shaft for driving the electric power generating device 1 in the embodiment of the present invention now under discussion.

The first connecting shaft 11, although having its longitudinal axis extending in a direction radially of the low pressure shaft 9 that is one of the rotary drive shafts of the engine, has the first end thereof connected directly with an input shaft of the electric power generating device 1, best shown in FIG. 1, with no accessory gearbox, such as hitherto required in the conventional device, intervening between the input shaft and the low pressure shaft 9.

In the illustrated embodiment, the electric power generating device 1 is fitted through a mounting pad 12 to the fan casing FC which forms a portion of the engine main body EB of the engine E, the details of which will be discussed later. It is however to be noted that, as is the case with the conventional device, the high pressure shaft 7 has a front end drivingly connected with a first end portion of a second connecting shaft 14 through bevel gears 13A and 13B that are engaged with each other while a second end portion of the second connecting shaft 14 is drivingly connected with an accessory gearbox (AGB) 19 that is employed for driving an accessory 18 such as, for example, a fuel pump and/or an oil pump. In this way, the aircraft engine E includes the engine main body EB, the electric power generating device 1 supported thereby, the accessory 18 and the accessory gearbox 19.

Figure 2:
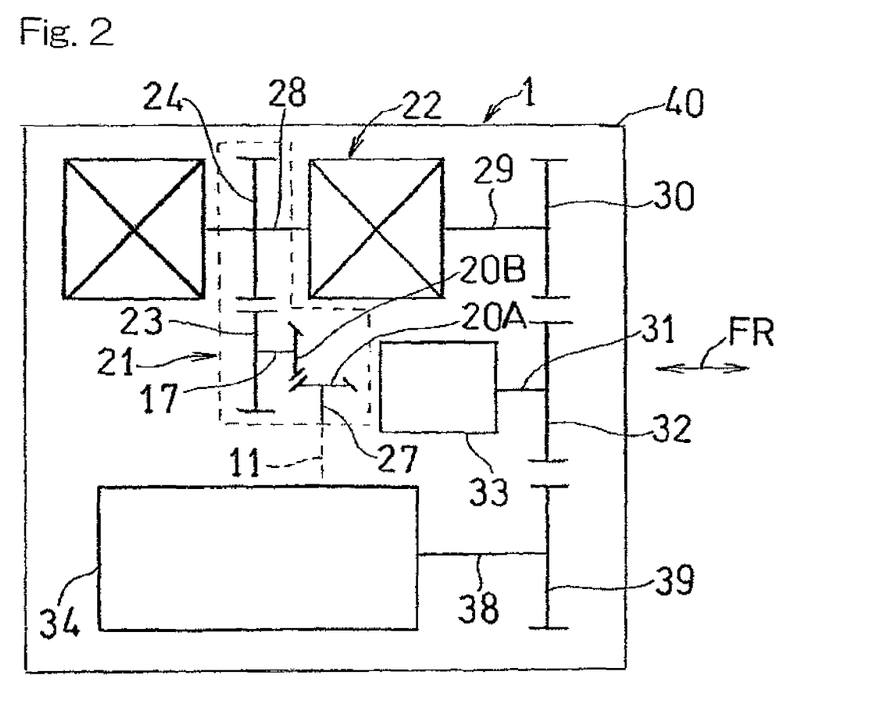
FIG. 2 is a schematic diagram showing a structure of an aircraft electric power generating device that is one example of the accessory.

Referring now to FIG. 2 showing a schematic diagram depicting a schematic structure of the electric power generating device 1 that is connected as an accessory, an input side of the electric power generating device 1 includes a transmission mechanism input shaft 27, having a first end portion connected directly with the first connecting shaft (take-out shaft) 11 of the engine E so as to extend in a radial direction R, as best shown in FIG. 1, and a transmission mechanism 21 connected with the transmission mechanism input shaft 27 and operable to drive a transmission 22 about an axis perpendicular to the first connecting shaft 11, that is, the engine shaft axis C in the instance as shown).

It is, however, to be noted that the input shaft 27 may not necessarily extend in the radial direction R best shown in FIG. 1, but may be inclined somewhat relative to the radial direction R. In other words, the input shaft 27 may work satisfactorily provided that it has a longitudinal axis extending in a direction intersecting the engine shaft axis C.

The transmission mechanism 21 referred to above includes a transmission shaft 17 having its longitudinal axis extending in an anteroposterior direction FR, a bevel gear 20A fixedly mounted on a second end portion of the transmission mechanism input shaft 27, which is opposite to the previously described first end portion thereof, a bevel gear 20B fixedly mounted on one end portion of the transmission shaft 17 and meshed with the bevel gear 20A, a transmission spur gear 23 fixedly mounted on the opposite end portion of the transmission shaft 17, and a spur gear 24 fixedly mounted on a transmission input shaft 28 and meshed with the transmission spur gear 23. The spur gear 24 referred to above serves as an input gear of the transmission 22.

A transmission output gear 30 fixedly mounted on a transmission output shaft 29 is meshed with an intermediate gear 32, which is in turn connected with a pump rotary shaft 31 for a lubricant oil pump 33 for rotation together therewith. Also, the intermediate gear 32 referred to above is also meshed with an electric power generator input gear 39 fixedly mounted on a rotary shaft 38 of an electric power generator 34. The transmission 22 and the electric power generator 34 are so disposed and so positioned as to be spaced a distance from each other in a direction circumferentially of the low pressure shaft 9, that is, circumferentially of the aircraft engine E.

It is to be noted that although the transmission output gear 30, the intermediate gear 32 and the electric power generator input shaft 39 are all in the form of a spur gear, but they may be employed in the form of a helical gear provided that the use is made of a thrust bearing.

Figure 3:
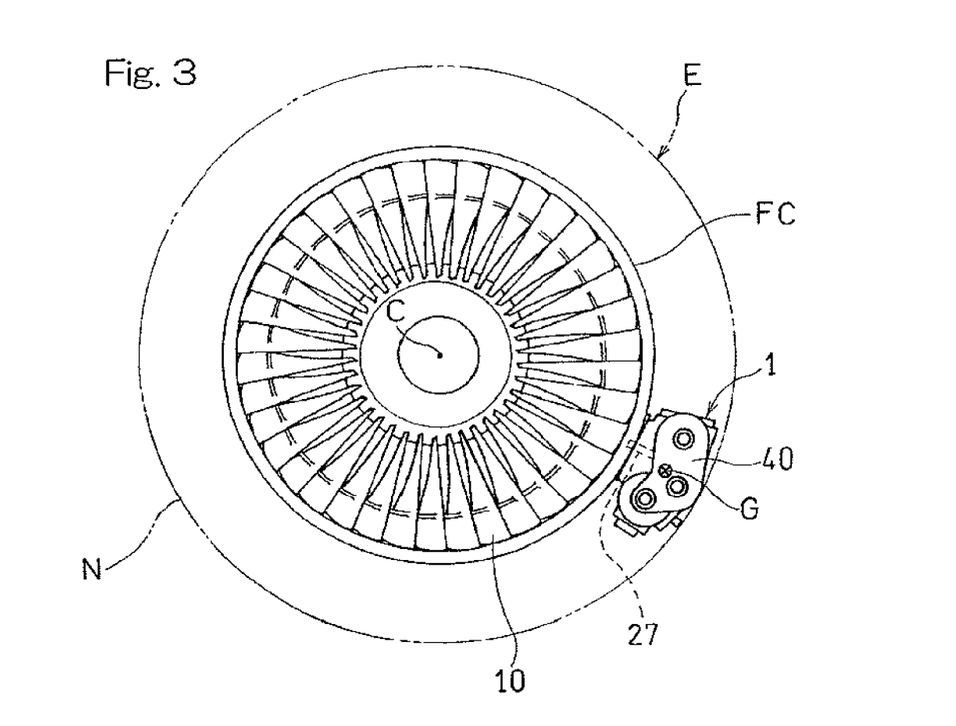
FIG. 3 is a front elevational view showing the aircraft engine.
Figure 4:
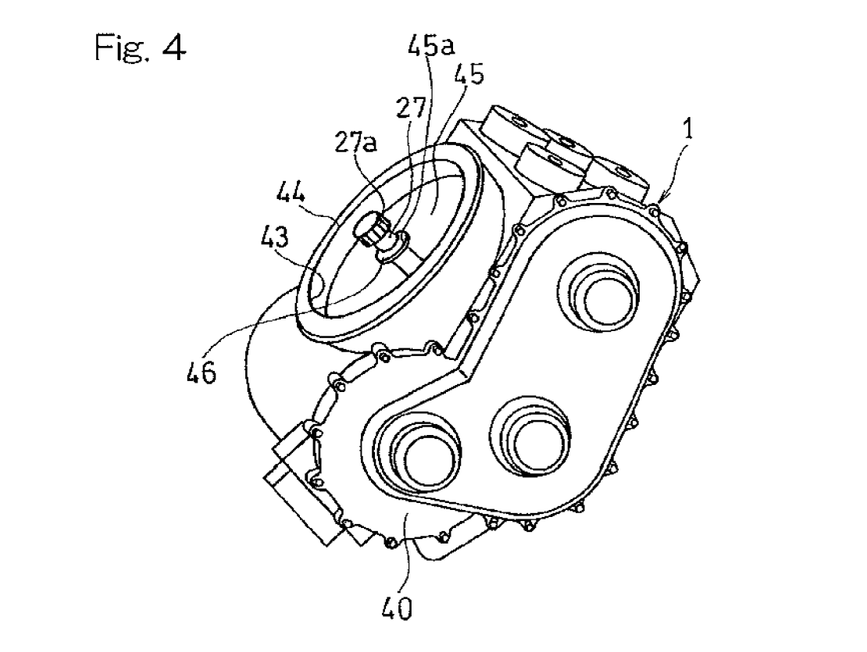
FIG. 4 is a perspective view showing the aircraft electric power generating device.

FIG. 3 illustrates a front elevational view showing how the aircraft electric power generating device 1 is fitted onto the aircraft engine E. The electric power generating device 1 is fitted to a side portion of the fan casing FC of the engine main body EB. As FIG. 3 makes it clear, the electric power generating device 1 is of a low profile structure with a small thickness, when viewed from front in a direction conforming to the engine shaft axis C, and is so formed as to have an oblong appearance with a great dimension in an up and down direction. Accordingly, the electric power generating device can be fitted to the side portion of the fan casing FC of the engine E with a minimized lateral protrusion. The engine E and the electric power generating device 1 are enclosed within an engine nacelle N. It is, however, to be noted that the electric power generating device 1 may be fitted to a side face portion of the main body casing BC rearwardly of the fan casing FC. The fan casing FC and the main body casing BC cooperate with each other to define an engine casing.

As shown in FIG. 2, an accessory casing 40 of the electric power generating device 1 encloses the transmission 22, the electric power generator 34, the oil pump 33 and the transmission mechanism 21. As best shown in FIG. 2, the accessory casing 40 has an opening 43 through which the transmission mechanism input shaft 27 extends, an accessory flange 44 surrounding the periphery of the opening 43, and a first covering 45 for closing the opening 43 and having a throughhole 45a defined at a center portion thereof for the passage of the input shaft 27 therethrough. In the throughhole 45a referred to above is disposed a first sealing member 46 for sealing a gap between the first covering 45 and the input shaft 27. The first covering 45 is used to avoid an undesirable ingress of foreign matters during, for example, storage and/or transportation and, accordingly, the use thereof may be dispensed with if so desired.

Figure 5:
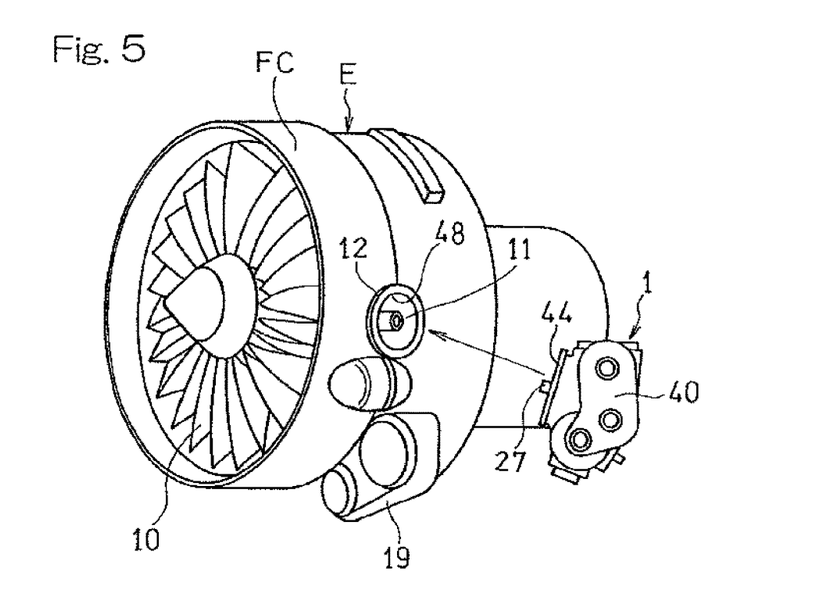
FIG. 5 is an exploded view of an aircraft engine main body, showing the position of the aircraft electric power generating device relative to the engine main body.

On the other hand, as shown in FIG. 5, the fan casing FC of the aircraft engine E is provided with not only the previously described accessory gearbox 19, but also an opening 48 for the passage of the first connecting shaft 11 therethrough and the previously described mounting pad 12 that defines a perimeter surrounding an outer periphery of the opening 48.

Figure 6:
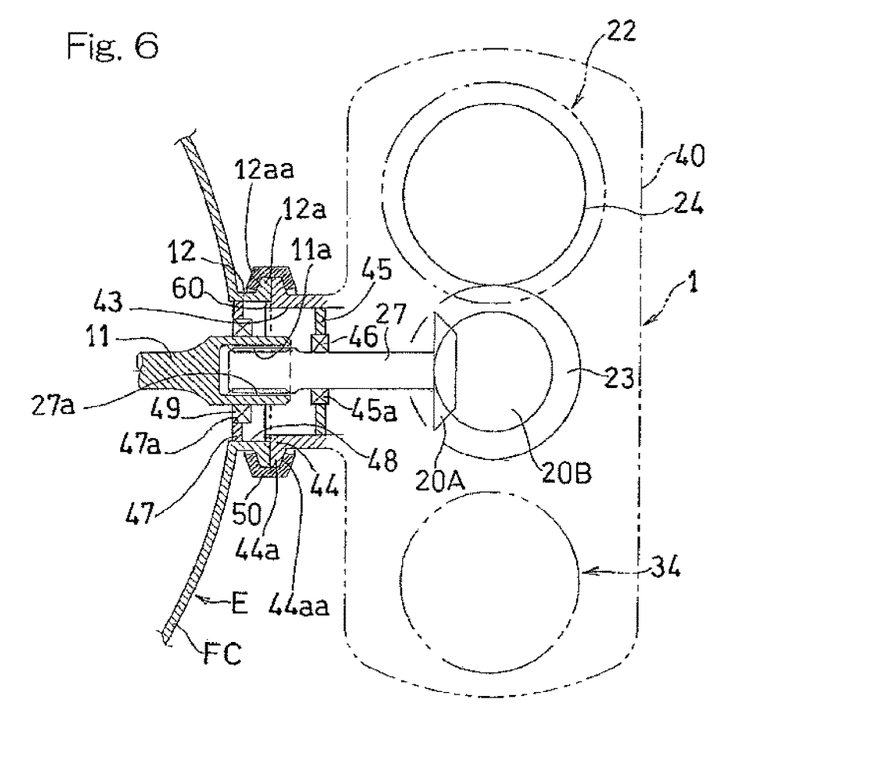
FIG. 6 is a sectional view of a portion of the aircraft engine, showing the site at which the aircraft electric power generating device is connected.

The electric power generating device 1 is mounted on the fan casing FC, which forms a portion of the aircraft engine main body EB by means of such a structure as shown in FIG. 6. Specifically, a front end portion of the annular accessory flange 44 referred to above is placed over a front end portion of the mounting pad 12 of the fan casing FC. Starting from this condition, an annular engagement projection 60 formed in the front end portion of the accessory flange 44 is engaged with an inner peripheral surface of the mounting pad 12 to thereby position the openings 43 and 48 relative to the mounting pad 12 of the accessory flange 44 in a radial direction thereof. It is, however, to be noted that the engagement projection 60 referred to above and shown and described as provided in the accessory flange 44 may be alternatively provided in the mounting pad 12.

The respective front end portions of the accessory flange 44 and the mounting pad 12 are formed with annular connecting projections 44a and 12a that protrude radially outwardly therefrom, and a clamp band 50 having a V shaped section, which is a connecting element, is mounted in part on the front end portion of the accessory flange 44 and in part on the front end portion of the mounting pad 12 in a fashion capped over the joint between the flange 44 and the pad 12. Respective side mounting faces 12aa and 44aa of the connecting projections 12a and 44a of the associated mounting pad 12 and the accessory flange 44, which are positioned opposite to mating faces of the connecting projections 12a and 44a, are so inclined relative to each other as to taper in a direction radially outwardly of the joint between the flange 44 and the pad 12. By so doing, the accessory casing 40 is fixed to the fan casing FC, thus completing the mount of the electric power generating device 1 on the aircraft engine E.

The second end portion of the first connecting shaft 11 referred to above has an axially extending socket defined therein and having an inner peripheral surface formed with inner peripheral splined keys or grooves 11a, whereas the first end portion of the transmission mechanism input shaft 27 referred to above has an outer peripheral surface formed with outer peripheral splined grooves or keys 27a engageable with the inner peripheral splined keys or grooves 11a. Accordingly, the engagement between the inner and outer peripheral splined keys and grooves 11a, 27a results in the transmission mechanism input shaft 27 to be splined to the first connecting shaft 11 for rotation together therewith, but to be removable axially from the first connecting shaft 11.

An outer diametric side portion of the opening 48 of the fan casing FC is closed by a second covering 47 of a kind having a throughhole 47a defined at a center portion thereof for the passage of the first connecting shaft 11 therethrough. In this throughhole 47a, a second sealing member 49 is disposed for liquid tightly sealing a gap between the second covering 27 and the first connecting shaft 11. This second sealing member 49 serves to avoid an undesirable ingress of foreign matters during, for example, storage and/or transportation of the aircraft engine E. A periphery of the first connecting shaft 11 within the opening 48 is sealed by those second covering 47 and the second sealing member 49.

Figure 7:
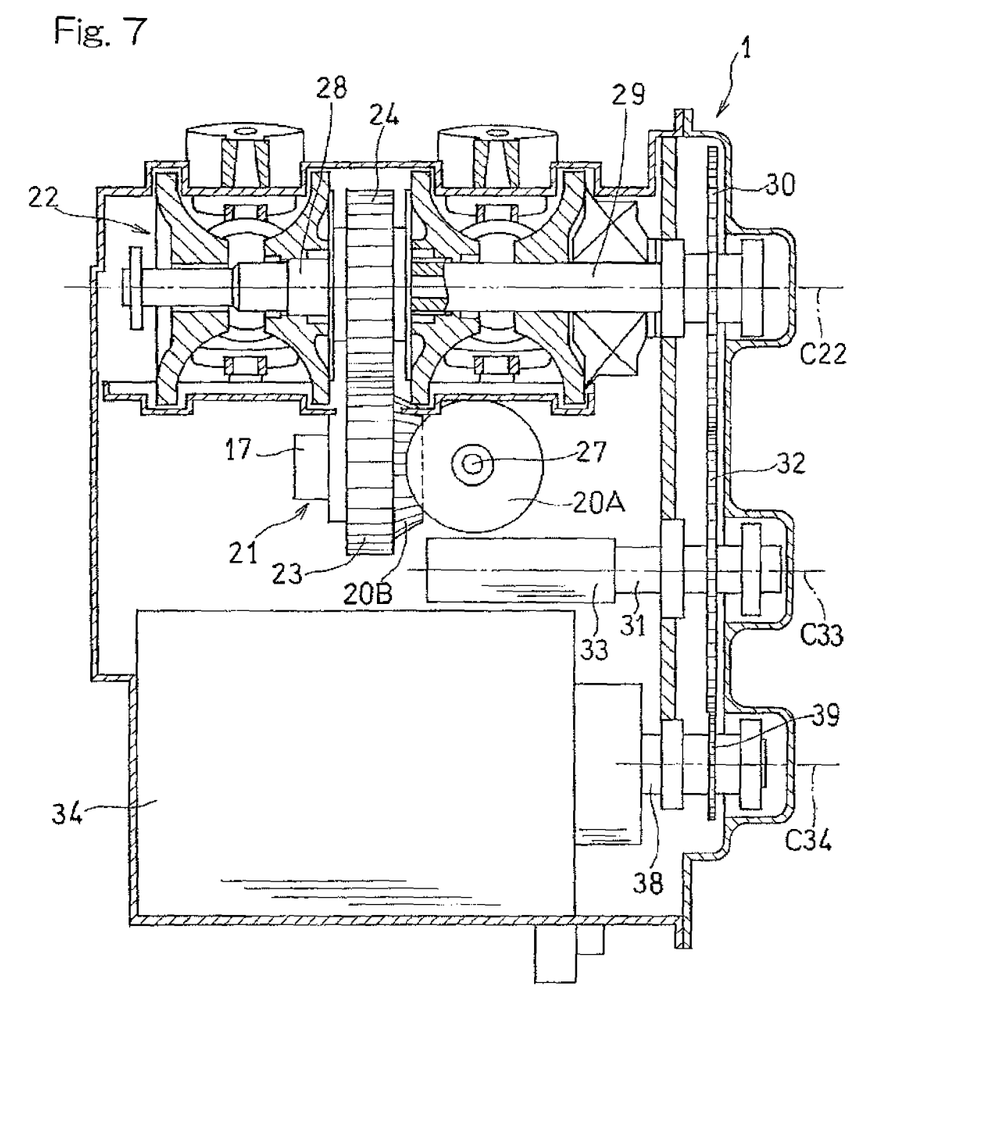
FIG. 7 is a schematic longitudinal sectional view of the aircraft electric power generating device.

The electric power generating device 1 includes, as shown in FIG. 7, the transmission mechanism input shaft 27 splined in such a manner as shown in FIG. 6 to the first connecting shaft 11 drivingly connected with the low pressure shaft 9 of the aircraft engine E, the variable speed traction transmission 22 drivingly connected with the transmission mechanism input shaft 27 through the transmission mechanism 21, the electric power generator 34 disposed below the traction transmission 22 and driven by an output of the traction transmission 22, and the lubricant oil pump 33 disposed between the traction transmission 22 and the electric power generator 34 and driven by the output of the traction transmission 22. The transmission mechanism 21, the traction transmission 22, the electric power generator 34 and the lubricant oil pump 33 have respective shaft axes C22, C34 and C33 that extend parallel to each other and also extend along the anteroposterior direction FR of the engine E, that is, the engine shaft axis C. Thanks to the transmission 22, even though the rotational speed of the low pressure shaft 9 fluctuates, the electric power generator 34 is driven at a constant number of revolution and at a high speed to output an electric alternating power of a constant frequency.

The operation of the aircraft engine E designed in accordance with the above described embodiment of the present invention will now be described. The rotation of the low pressure shaft 9 of the engine E shown in FIG. 1 is transmitted to the electric power generating device 1 through the first connecting shaft 11, which is the take-out shaft, and the transmission mechanism input shaft 27 shown in FIG. 2. In the electric power generating device 1, a drive power is transmitted from the transmission mechanism input shaft 27 to the electric power generator 34 through the transmission mechanism 21, the traction transmission 22 and the intermediate gear 32. By the rotation of the electric power generator 34, electricity is generated.

Figure 8:
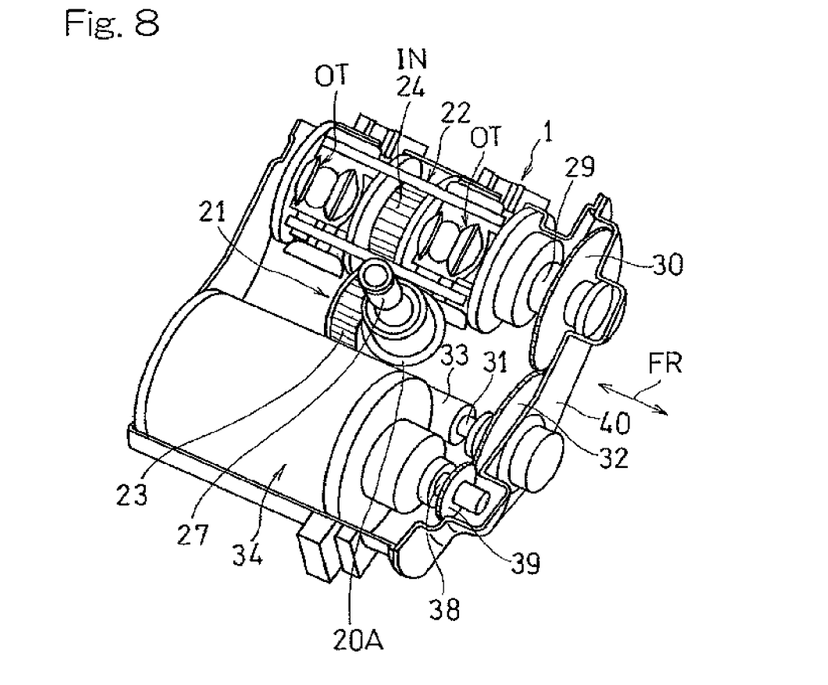
FIG. 8 is a perspective view, as viewed from front, showing the interior structure of a casing for the aircraft electric power generating device.

Also, since in this electric power generating device, the transmission mechanism input shaft 27 best shown in FIG. 8 is disposed between the electric power generator 34 and the traction transmission 22 positioned in a direction circumferentially of the low pressure shaft 9, positioning of the transmission mechanism input shaft 27 between the electric power generator 34 and the traction transmission 22 having a relatively large weight allows the transmission mechanism input shaft 27 to be positioned at a location near to the center of gravity, shown in FIG. 3, of the electric power generating device 1. As a result, the overhang moment of the center of gravity G relative to a mounting flange 44 defining a mounting surface for the electric power generating device 1 to be fitted to the engine E becomes reduced, making it possible to accomplish a stable mounting of the electric power generating device 1 on the engine E stably.

In the aircraft engine E of the type referred to above, since the electric power generating device 1, which is one of the accessories, is supported in a fashion connected with the mounting pad 12 of the engine main body EB, there is no need to use any existing accessory gearbox intermediate between the electric power generating device 1 and the engine main body EB. Because of it, even though the shape of the electric power generator 1 becomes large and/or the number of fittings of the accessories including the electric power generator 1 increases, the accessory gearbox need not be employed and, therefore, the increase in overall shape of the aircraft engine 1 can be suppressed.

The electric power generating device 1 is connected with the first connecting shaft (take-out shaft) extending through the second covering 47 within the opening 48 of the mounting pad 12 and is driven when the rotation of the low pressure shaft 9 of the aircraft engine E is transmitted thereto through the first connecting shaft 11. Assuming here that the mounting pad 12 fitted to the fan casing FC is of a large diameter shape, the accessory casing 40 defining an outer perimeter of the electric power generating device 1 can be firmly supported by the mounting pad 12 of the large diameter even when the electric power generating device 1 is increased in size. Thus, even with the mounting pad 12 of the large diameter, there is no ingress of the foreign matters into the fan casing FC and, hence, into the engine main body EB through the opening 48 because the opening 48 inside the mounting pad 12 is sealed by the covering 47 and the sealing member 49.

Also, the aircraft engine E of the kind discussed hereinbefore makes use of the accessory flange 44 formed in the accessory casing 40 of the electric power generating device 1 and, by means of a simple work process in which the accessory flange 44 is butted with the mounting pad 12 of the fan casing FC in a direction axially of both of the mounting pad 12. Then the accessory flange 44 and the clamp band 50, which is a connecting element, is engaged over respective sides of the connecting projection 12a of the mounting pad 12 and the connecting projection 44a of the accessory flange 44. Thus, the accessory casing 40 can be mounted firmly on the fan casing FC.

When a large load is extracted from the high pressure shaft 7 connected with the compressor 2, the engine stall is apt to occur during a low engine output such as, for example, idling on the ground or descent. Whereas in this preferred embodiment the electric power generating device 1 is driven by the low pressure shaft 9 through the first connecting shaft 11 enough to provide a large capacity power generation because the low pressure shaft 9 has limitations on take-out load that are minimal. Also, since the first connecting shaft 11 of the engine E is splined to the input shaft 27 of the electric power generating device 1, not only can the first connecting shaft 11 of the engine E be rotatable together with the input shaft 27 of the electric power generating device 1, but the first connecting shaft 11 can also be movable in the axial direction for separation of those shafts 11 and 27 from each other. Accordingly, the electric power generating device 1 can be easily connected with and separated from the low pressure shaft 9.

Figure 9:
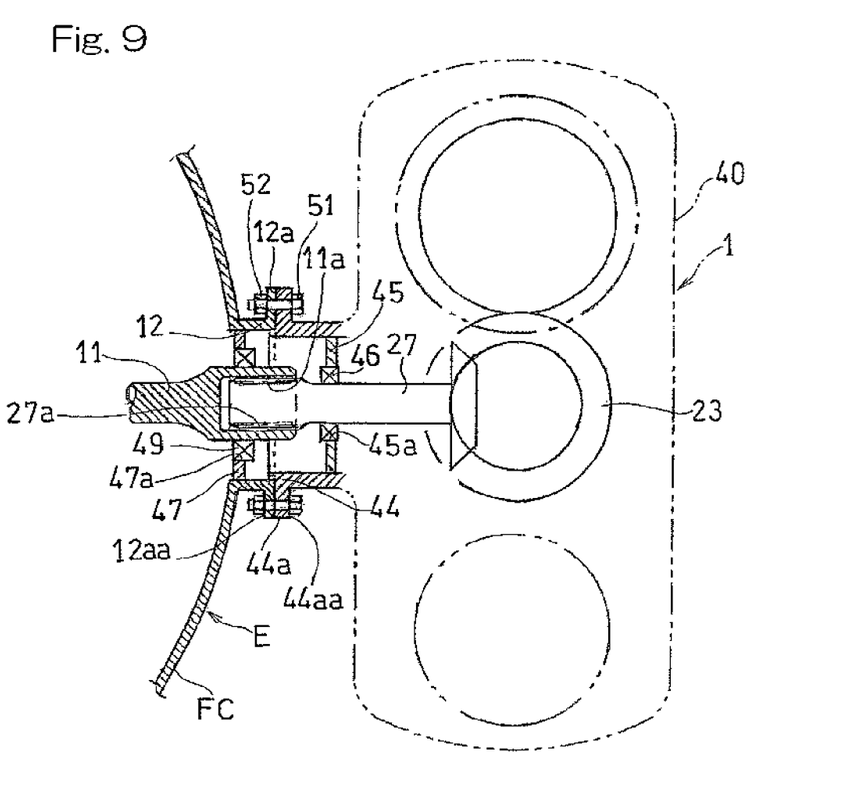
FIG. 9 is a view similar to FIG. 6, showing the connection between the aircraft engine and the aircraft electric power generating device according to a second preferred embodiment of the present invention.

FIG. 9 illustrates a sectional view of a portion of the aircraft engine according to a second preferred embodiment of the present invention, showing how the electric power generating device 1 is fitted thereto. This second embodiment of the present invention is substantially similar to the previously described first embodiment, but differs therefrom in that, instead of the use of the clamp band 50 employed in the first embodiment, bolts 51 and nuts 52 associated with such bolts 51 are employed to connect the accessory flange 44 of the accessory casing 40 with the mounting pad 12 of the fan casing FC. The use of the bolts 51 and the associated nuts 52 makes it possible to achieve a further firm connection between the mounting pad 12 and the accessory flange 44 that are butted together in the manner described previously.

It is to be noted that the side mounting face 44aa of the connecting projection 44a of the accessory flange 44 and the side mounting face 12aa of the connecting projections 12a of the mounting pad 12 are both so shaped as to represent flat faces that lie in the direction radially of the associated openings 43 and 44, that is, the direction perpendicular to the common shaft axis of the input shaft 27 and the first connecting shaft 11.

It is also to be noted that although in describing the foregoing preferred embodiments of the present invention, reference has been made to the electric power generating device 1 used as the accessory that is connected with the engine rotary shaft, the present invention can be equally applicable to the use of, for example, a fuel pump or an oil pump as the accessory. In addition, the engine rotary shaft with which the accessory is connected may not be necessarily limited to the low pressure shaft 9 that is referred to in describing the preferred embodiments of the present invention and may be the high pressure shaft 7. Yet, although reference has been made to the double shaft type aircraft engine E, the present invention can be equally applied to a single shaft type aircraft engine.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented. Accordingly, such changes and modifications are, unless they depart from the scope of the present invention as delivered from the claims annexed hereto, to be construed as included therein.

REFERENCE NUMERALS 1, 1A Aircraft electric power generating device (Accessory)
7 High pressure shaft (Engine rotary shaft)
9 Low pressure shaft (Engine rotary shaft)
11 First connecting shaft (Take-out shaft)
12 Mounting pad
27 Transmission mechanism input shaft (Input shaft)
40 Accessory casing
44 Accessory flange
47 Second covering (Covering)
47a Throughhole
48 Opening
49 Second sealing member (Sealing member)
50 Clamp band (Connecting band)
51 Bolt (Connecting element)
52 Nut (Connecting element)
BC Main body casing
E Aircraft engine
EB Engine main body
FC Fan casing (Part of the engine main body)
R Radial direction

What is claimed is:

1. An aircraft engine which comprises:
an engine main body;
a low pressure shaft to drive a fan;
a high pressure shaft driving a compressor;
a first take-out shaft having a first end portion connected with the low pressure shaft so as to extend radially outwardly of the engine;
a second take-out shaft having a first end portion connected with the high pressure shaft so as to extend radially outwardly of the engine;
a first accessory, a portion of which is connected with a second end portion opposite to the first end portion of the first take-out shaft and having an accessory casing;
an accessory gearbox (AGB) connected with a second end portion opposite to the first end portion of the second take-out shaft and being configured to drive a second accessory;
a mounting pad provided in the engine main body and to which the first accessory is fitted, the mounting pad defining an outer perimeter of an opening through which the first take-out shaft extends;
a covering, through which the first take-out shaft extends;
a sealing member for sealing between the covering and the first take-out shaft, the opening in the mounting pad being sealed by the covering and the sealing member; and
a connecting element connecting the mounting pad and an accessory flange, formed in the accessory casing, together while the mounting pad and the accessory flange are butted together, thereby supporting the first accessory to the engine main body without any gearbox disposed intermediate therebetween, wherein
the first accessory includes an operation device and a continuously variable transmission disposed between the operation device and the first take-out shaft,
the operation device the continuously variable transmission are connected with the second end portion of the first take-out shaft via bevel gears, and
the operation device, the continuously variable transmission and the bevel gears are accommodated in the accessory casing.

2. The aircraft engine as claimed in claim 1, wherein the connecting element comprises a connecting band.

3. The aircraft engine as claimed in claim 1, wherein the connecting element comprises a bolt and an associated nut.

4. The aircraft engine as claimed claim 1, wherein the first accessory is an electric power generating device.

5. The aircraft engine as claimed in claim 1, wherein the first take-out shaft is splined to an input shaft of the first accessory.

6. An aircraft engine which comprises:
an engine main body including a fan casing;
a low pressure shaft to drive a fan;
a high pressure shaft driving a compressor;
a first take-out shaft having a first end portion connected with the low pressure shaft so as to extend radially outwardly of the engine;
a second take-out shaft having a first end portion connected with the high pressure shaft so as to extend radially outwardly of the engine;
a first accessory, a portion of which is connected with a second end portion opposite to the first end portion of the first take-out shaft and having an accessory casing;
an accessory gearbox (AGB) connected with a second end portion opposite to the first end portion of the second take-out shaft and being configured to drive a second accessory;
a mounting pad provided in the fan casing and to which the first accessory is fitted, the mounting pad defining an outer perimeter of an opening through which the first take-out shaft extends;
a covering, through which the first take-out shaft extends;

a sealing member for sealing between the covering and the first take-out shaft, the opening in the mounting pad being sealed by the covering and the sealing member; and a connecting element connecting the mounting pad and an accessory flange, formed in the accessory casing, together while the mounting pad and the accessory flange are butted together, thereby supporting the first accessory to the fan casing without any gearbox disposed intermediate therebetween, wherein the first accessory includes an operation device and a continuously variable transmission disposed between the operation device and the first take-out shaft, the operation device and the continuously variable transmission are connected with the second end portion of the first take-out shaft via bevel gears, and the operation device, the continuously variable transmission and the bevel gears are accommodated in the accessory casing.

7. The aircraft engine as claimed in claim 1, wherein the operation device and the continuously variable transmission rotate about an axis perpendicular to the first take-out shaft.

8. The aircraft engine as claimed in claim 6, wherein the operation device and the continuously variable transmission rotate about an axis perpendicular to the first take-out shaft.

* * * * *